US012767168B2

(12) United States Patent
Min et al.

(10) Patent No.: US 12,767,168 B2
(45) Date of Patent: Oct. 20, 2026

(54) SYSTEM AND METHOD FOR INFRASTRUCTURE DYNAMIC OBJECT RECOGNITION INFORMATION CONVERGENCE PROCESSING IN AUTONOMOUS VEHICLE

(71) Applicant: Electronics and Telecommunications Research Institute, Daejeon (KR)

(72) Inventors: Kyoung-Wook Min, Daejeon (KR); Yoo-Seung Song, Daejeon (KR); Yongwoo Jo, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 259 days.

(21) Appl. No.: 18/354,412

(22) Filed: Jul. 18, 2023

(65) Prior Publication Data

US 2024/0043033 A1 Feb. 8, 2024

(30) Foreign Application Priority Data

Aug. 3, 2022 (KR) ........................ 10-2022-0096760
Apr. 17, 2023 (KR) ........................ 10-2023-0050048

(51) Int. Cl.
*B60W 60/00* (2020.01)
*G06V 20/56* (2022.01)
*H04W 4/44* (2018.01)

(52) U.S. Cl.
CPC ........... *B60W 60/001* (2020.02); *G06V 20/56* (2022.01); *H04W 4/44* (2018.02); *B60W 2552/00* (2020.02); *B60W 2556/45* (2020.02)

(58) Field of Classification Search
CPC ........... B60W 60/001; B60W 2552/00; B60W 2556/45; B60W 2554/40; B60W 2556/25; G06V 20/56; G06V 20/58; H04W 4/44
See application file for complete search history.

(56) References Cited

U.S. PATENT DOCUMENTS

2013/0090803 A1* 4/2013 Stahlin .................. G08G 1/163 701/30.3
2016/0028824 A1* 1/2016 Stenneth ............... G07C 5/008 709/219

(Continued)

FOREIGN PATENT DOCUMENTS

KR 10-2020-0068776 6/2020
KR 10-2020-0094075 8/2020

(Continued)

*Primary Examiner* — Jelani A Smith
*Assistant Examiner* — Alyssa Rorie
(74) *Attorney, Agent, or Firm* — KILE PARK REED & HOUTTEMAN PLLC

(57) ABSTRACT

The system for infrastructure dynamic object recognition information convergence processing in an autonomous vehicle according to an embodiment of the present invention includes a recognition unit configured to receive object information collected by a sensor of the autonomous vehicle to recognize an environment, a V2X reception message processing unit configured to receive object information collected by an InfraEdge system, and a determination and control unit configured to use the object information collected by the sensor and the object information collected by the InfraEdge system and perform a determination for autonomous driving in consideration of a convergence delay time which is a time difference between a time recorded according to message reception of the V2X reception message processing unit and a current time.

8 Claims, 24 Drawing Sheets

(56) References Cited

U.S. PATENT DOCUMENTS

| | | | | |
|---|---|---|---|---|
| 2017/0221366 | A1 | 8/2017 | An et al. | |
| 2019/0281603 | A1 | 9/2019 | Oh et al. | |
| 2020/0021960 | A1* | 1/2020 | Hwang | G06Q 10/0635 |
| 2020/0026290 | A1* | 1/2020 | Lim | G05D 1/0022 |
| 2021/0279481 | A1* | 9/2021 | Son | G08G 1/0116 |
| 2022/0103986 | A1 | 3/2022 | Hwang et al. | |
| 2022/0332327 | A1* | 10/2022 | Lee | B60W 40/105 |
| 2022/0397895 | A1* | 12/2022 | Urano | G05D 1/0038 |
| 2023/0064268 | A1* | 3/2023 | Mindt | G06V 10/98 |
| 2023/0091772 | A1* | 3/2023 | Frye | B60W 60/001 701/25 |
| 2023/0128212 | A1* | 4/2023 | Azuma | H04W 4/023 701/25 |
| 2023/0169775 | A1* | 6/2023 | Taniguchi | G08G 1/167 |
| 2023/0176183 | A1* | 6/2023 | Sanberg | G01S 7/40 701/31.4 |
| 2023/0211776 | A1* | 7/2023 | Yang | B60W 30/08 701/23 |
| 2024/0259989 | A1* | 8/2024 | Li | G01S 5/0244 |

FOREIGN PATENT DOCUMENTS

| | | |
|---|---|---|
| KR | 10-2021-0011258 | 2/2021 |
| KR | 10-2021-0029684 | 3/2021 |
| KR | 10-2022-0073472 | 6/2022 |

* cited by examiner

INFRASTRUCTURE RECOGNITION VIEW :
RECOGNIZE ALL OF (1) TO (4)

AUTONOMOUS VEHICLE RECOGNITION VIEW :
NOT RECOGNIZE (1) AND (2) BY BUILDING

INFRASTRUCTURE RECOGNITION CONVERGENCE RESULT VIEW IN AUTONOMOUS VEHICLE : (1) AND (2) USE RECOGNITION RESULT OF INFRASTRUCTURE, (3) AND (4) USE RECOGNITION RESULT OF AUTONOMOUS VEHICLE

SYSTEM AND METHOD FOR INFRASTRUCTURE DYNAMIC OBJECT RECOGNITION INFORMATION CONVERGENCE PROCESSING IN AUTONOMOUS VEHICLE

CROSS-REFERENCE TO RELATED APPLICATION

This application claims priority to and the benefit of Korean Patent Application Nos. 10-2022-0096760 filed on Aug. 3, 2022, and 10-2023-0050048 filed on Apr. 17, 2023, the disclosure of which is incorporated herein by reference in its entirety.

BACKGROUND

1. Field of the Invention

The present invention relates to a system and method for infrastructure dynamic object recognition information convergence processing in an autonomous vehicle, and more particularly, to an infrastructure-cooperative autonomous driving system and method for supporting safe autonomous driving by transmitting information on dynamic objects (e.g., car, person, bike, etc.) recognized by the infrastructure to an autonomous vehicle.

2. Discussion of Related Art

According to the related art, it is difficult to confirm whether an object detected by infrastructure and an object detected in an autonomous vehicle are the same object or different objects due to a difference in recognition time between the infrastructure and the autonomous vehicle and the occurrence of a convergence delay time due to communication delay time.

SUMMARY OF THE INVENTION

The present invention has been proposed to solve the above problems, and provides an autonomous driving system and method for supporting safe autonomous driving of an autonomous vehicle by correcting a location of an infrastructure recognition object and determining whether the infrastructure recognition object is the same as a recognition object of an autonomous vehicle in comprehensive consideration of infrastructure recognition information, recognition time, and communication delay time.

According to an embodiment of the present invention, a system for infrastructure dynamic object recognition information convergence processing in an autonomous vehicle includes a recognition unit configured to receive object information collected by a sensor of the autonomous vehicle to recognize an environment; a V2X reception message processing unit configured to receive object information collected by an InfraEdge system; and a determination and control unit configured to use the object information collected by the sensor and the object information collected by the InfraEdge system and perform a determination for autonomous driving in consideration of a convergence delay time which is a time difference between a time recorded according to message reception of the V2X reception message processing unit and a current time.

The recognition unit may recognize the environment including a driving environment, a driving situation, and surrounding dynamic objects of the autonomous vehicle.

The V2X reception message processing unit may receive a message transmitted according to a message protocol including ID of the InfraEdge system, a recognition processing time, a recognition information transmission time, recognition information, and recognition accuracy of the InfraEdge system.

The determination and control unit may establish a driving plan using the object information collected by the sensor and the object information collected by the InfraEdge system, and generate and follow a local route.

The determination and control unit may correct a location of an object included in the object information collected by the InfraEdge system in consideration of the convergence delay time, and calculate an overlap between location information of a corrected object and location information of the object collected by the sensor of the autonomous vehicle.

When it is confirmed that the object is not the same, the determination and control unit may use the corresponding object to determine the autonomous driving, and when it is confirmed that the object is the same object, select a final object based on recognition accuracy.

According to another embodiment of the present invention, a system for infrastructure dynamic object recognition information convergence processing in an autonomous vehicle includes: a recognition unit configured to receive object information collected by a sensor of the autonomous vehicle to recognize an environment; a V2X reception message processing unit configured to receive object information collected by an InfraEdge system; and a determination and control unit configured to use the object information collected by the sensor and the object information collected by the InfraEdge system, and perform a determination for autonomous driving in consideration of a reflection area of the InfraEdge system.

The V2X reception message processing unit may receive a message transmitted according to a message protocol including ID of the InfraEdge system, a recognition processing time, a recognition information transmission time, the reflection area, recognition information, and recognition accuracy of the InfraEdge system.

The determination and control unit may correct a location of an object included in the object information collected by the InfraEdge system in consideration of the convergence delay time, which is a time difference between a time recorded according to message reception of the V2X reception message processing unit and a current time.

The determination and control unit may consider location information of a corrected object and the reflection area of the InfraEdge system to calculate an overlap between the location information of the corrected object and location information of the object collected by the sensor of the autonomous vehicle when the location information of the corrected object and the location information of the collected object are not included in the reflection area and confirm whether the object is the same object, and may use the corresponding object to determine the autonomous driving when it is confirmed that the object is not the same and selects a final object based on recognition accuracy when it is confirmed that the object is the same object.

The determination and control unit may consider the location information of the corrected object and the reflection area of the InfraEdge system, and when the location information of the corrected object is included in the reflection area, if the object is the object recognized by the InfraEdge system, use the recognized object to determine the autonomous driving, and if it is an object recognized by the sensor of the autonomous vehicle, discard the recognized object.

According to still another embodiment of the present invention, a method of infrastructure dynamic object recognition information convergence processing in an autonomous vehicle includes: (a) collecting first object information collected by a sensor of an autonomous vehicle and second object information collected by an InfraEdge system; and (b) establishing a driving plan for autonomous driving in consideration of a convergence delay time which is a time difference between a time recorded according to reception of the second object information and a current time.

In step (a), when the second object information is collected, a message transmitted according to a message protocol including ID, a recognition processing time, a recognition information transmission time, recognition information, and recognition accuracy of the InfraEdge system may be received.

In step (b), a location of an object included in the second object information may be corrected in consideration of the convergence delay time and an overlap between a location of a corrected object and a location included in the first object information may be calculated to confirm whether the object is the same object.

In step (b), when it is confirmed that the object is not the same, the corresponding object may be used to establish the driving plan, and when it is confirmed that the object is the same object, a final object may be selected based on the recognition accuracy.

When considering a reflection area of the InfraEdge system, in step (a), in collecting the second object information, a message transmitted according to a message protocol additionally including the reflection area may be received.

In step (b), it may be confirmed whether the location of the second object information on which correction is performed is included in the reflection area of the InfraEdge system in consideration of the convergence delay time, and when the location of the second object information is not included in the reflection area, an overlap between the location of the second object information on which the correction is performed and the location of the first object information may be calculated to confirm whether the object is the same object, when it is confirmed that the object is not the same, the corresponding object may be used to establish the driving plan, and when it is confirmed that the object is the same object, a final object may be selected based on the recognition accuracy.

In step (b), it may be confirmed whether the location of the second object information on which the correction is performed in consideration of the convergence delay time is included in the reflection area of the InfraEdge system, and when the location of the second object information is included in the reflection area, the second object information may be used to establish the driving plan.

DETAILED DESCRIPTION OF EXEMPLARY EMBODIMENTS

The above-mentioned aspect, and other aspects, advantages, and features of the present disclosure and methods accomplishing them will become apparent from the following detailed description of exemplary embodiments with reference to the accompanying drawings.

However, the present invention may be modified in many different forms and it should not be limited to the exemplary embodiments set forth herein, and only the following embodiments are provided to easily inform those of ordinary skill in the art to which the present invention pertains the objects, configurations, and effects of the present invention, and the scope of the present invention is defined by the description of the claims.

Meanwhile, terms used in the present specification are for explaining exemplary embodiments rather than limiting the present invention. Unless otherwise stated, a singular form includes a plural form in the present specification. "Comprises" and/or "comprising" used in the present invention indicate(s) the presence of stated components, steps, operations, and/or elements but do(es) not exclude the presence or addition of one or more other components, steps, operations, and/or elements.

Figure 1:
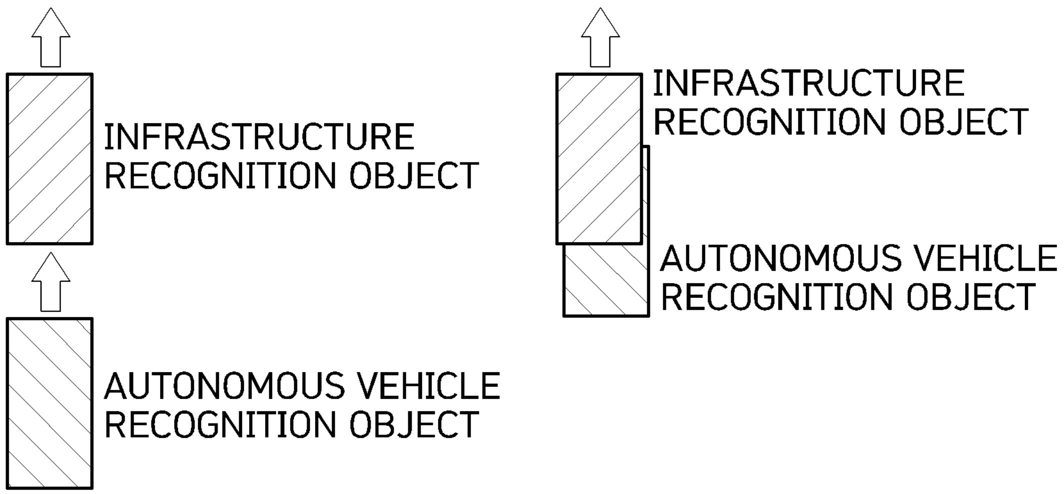
FIGS. 1 and 2 is a diagram illustrating a difficulty of object classification according to the related art.
Figure 2:
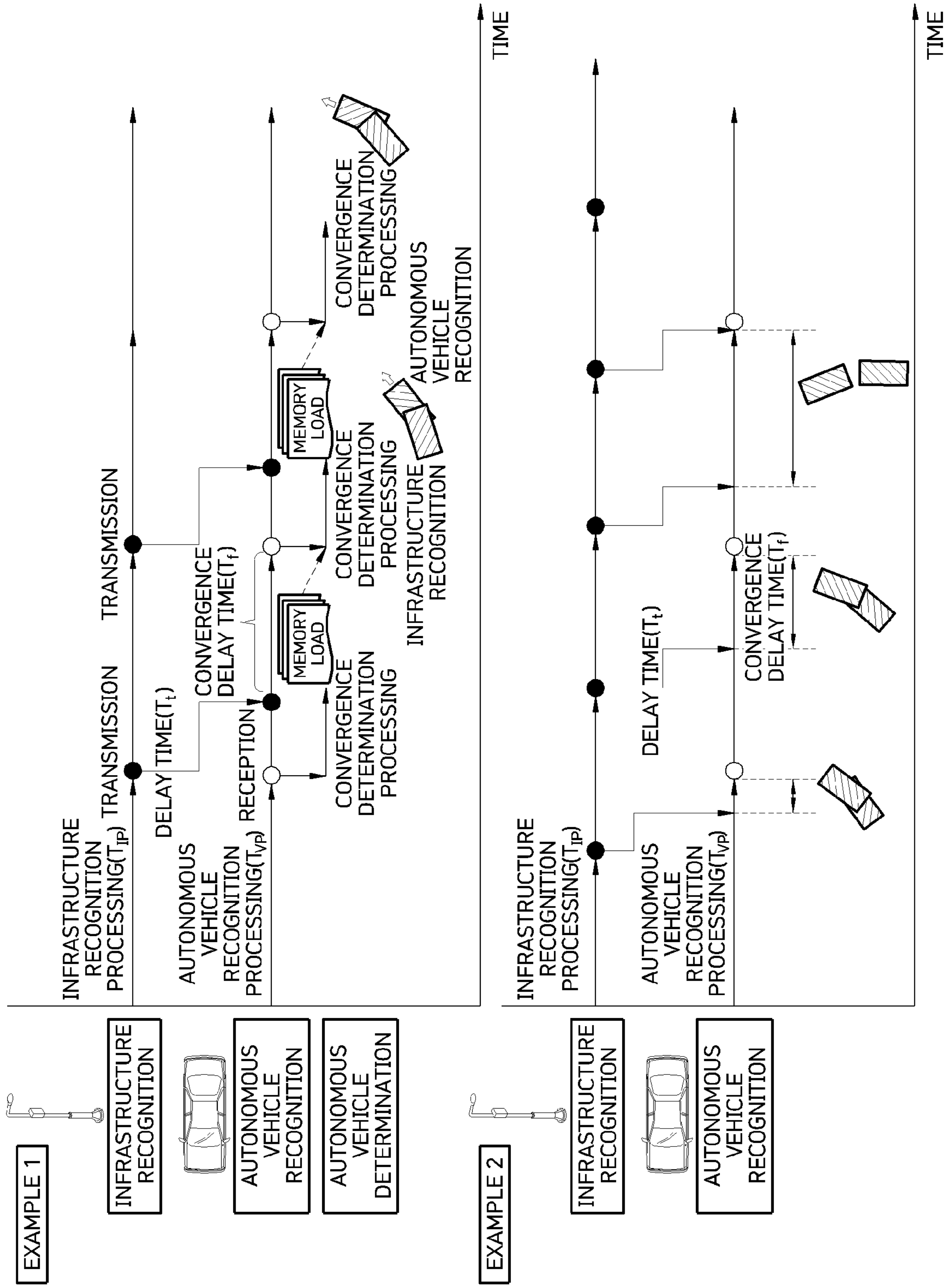

FIGS. 1 and 2 is a diagram illustrating a difficulty of object classification according to the related art.

Since an autonomous vehicle has a blind spot due to limitations in sensing and recognition, an autonomous driving technology that cooperates with infrastructure is proposed to compensate for the limitations. For example, when an autonomous vehicle does not recognize an object hidden in a building or facility in a right turn section or a roundabout section, autonomous driving may be safely performed by receiving information of an object recognized by infrastructure.

However, the autonomous vehicle has a problem in that it is difficult to distinguish whether a dynamic object corresponding to the information received from the infrastructure corresponds to a shaded area of the autonomous vehicle or is an object recognized by the autonomous vehicle. It is difficult to confirm whether the object is the same object or different objects using location information detected by the infrastructure and autonomous vehicle, and it is difficult to determine whether to use or discard the infrastructure recognition object information received from the autonomous vehicle.

The above-described problems are caused by the uncertainty of determining the presence or absence of the same object due to a convergence delay time (TF) that is caused by a recognition time difference (TIP and TVP) and a communication delay time (TL) between the infrastructure and the autonomous vehicle.

In general, recognition, determination, and control processing processes of the autonomous vehicle use the result at the time when the recognition processing is completed to perform determination/control. Due to the difference in time when the infrastructure transmits the result after recognition processing (V2X communication device) and the autonomous vehicle receives the result, the convergence delay time occurs to reflect the result in the determination/control of the autonomous vehicle.

As a result, the information of the infrastructure recognition (detection) object is already past information due to the time difference (communication delay time and convergence delay time), so it is difficult to determine whether the object is the same object or different objects using the location information of the object.

The present invention has been proposed to solve the above problems, and according to an embodiment of the present invention, the location of the infrastructure recognition object is corrected by comprehensively considering the recognition information, the recognition time, the communication delay time, etc., of the infrastructure, and it is determined whether the object is the same as the autonomous vehicle recognition object. According to an embodiment of the present invention, in the case of the object that the infrastructure recognizes and the autonomous vehicle does not recognize, the infrastructure recognition object is used for the determination/control of the autonomous vehicle system, and in the case of the same object that the infrastructure and the autonomous vehicle detect at the same time, an object having high detection accuracy is selected and used for the determination/control of the autonomous vehicle system.

According to an embodiment of the present invention, it is determined whether the object recognized by the InfraEdge system and the object recognized by the autonomous vehicle system are the same, and an appropriate object is selected and used to determine/control the autonomous driving.

According to another embodiment of the present invention, the InfraEdge system analyzes/identifies the blind spot of the autonomous vehicle to set a shaded area, and the autonomous vehicle preferentially selects the result recognized by the InfraEdge system based on information on objects in the shaded area and uses the selected result to determine/control the autonomous driving.

Figure 3:
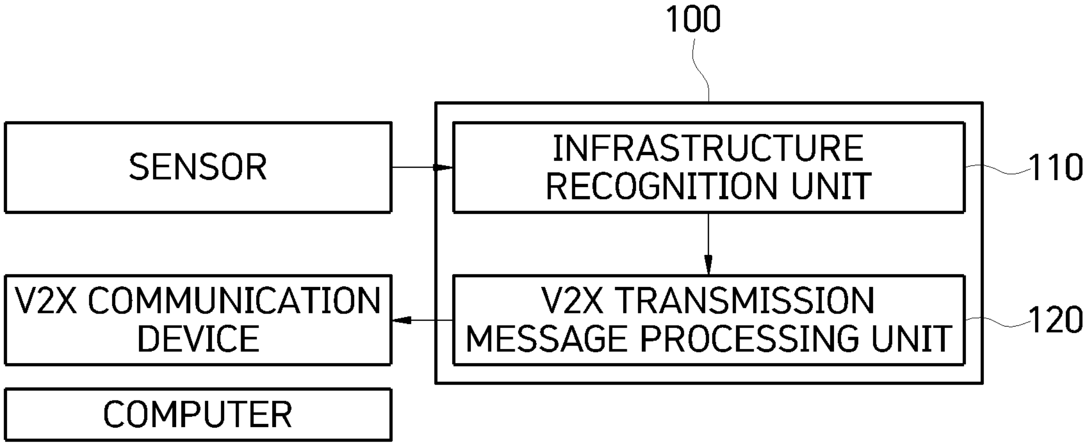
FIG. 3 is a diagram illustrating a configuration of an InfraEdge system according to an embodiment of the present invention.

FIG. 3 is a diagram illustrating a configuration of an InfraEdge system according to an embodiment of the present invention.

An InfraEdge system 100 according to an embodiment of the present invention includes an infrastructure recognition unit 110 that receives sensing information from sensors (lidar, camera, radar, etc.) and a V2X transmission message processing unit 120 that generates a V2X transmission message transmitted through a V2X communication device (road side unit (RSU)) connected to a computer. The infrastructure recognition unit 110 performs a process of recognizing (classifying, detecting, tracking, predicting) a dynamic object using an infrastructure sensor. The V2X transmission message processing unit 120 performs a process of constructing and broadcasting a message set to transmit an infrastructure recognition result. The InfraEdge system 100 according to an embodiment of the present invention processes recognition using a sensor in the infrastructure, configures a recognition result message set using the V2X communication device, and broadcasts the recognition result message.

Figure 4:
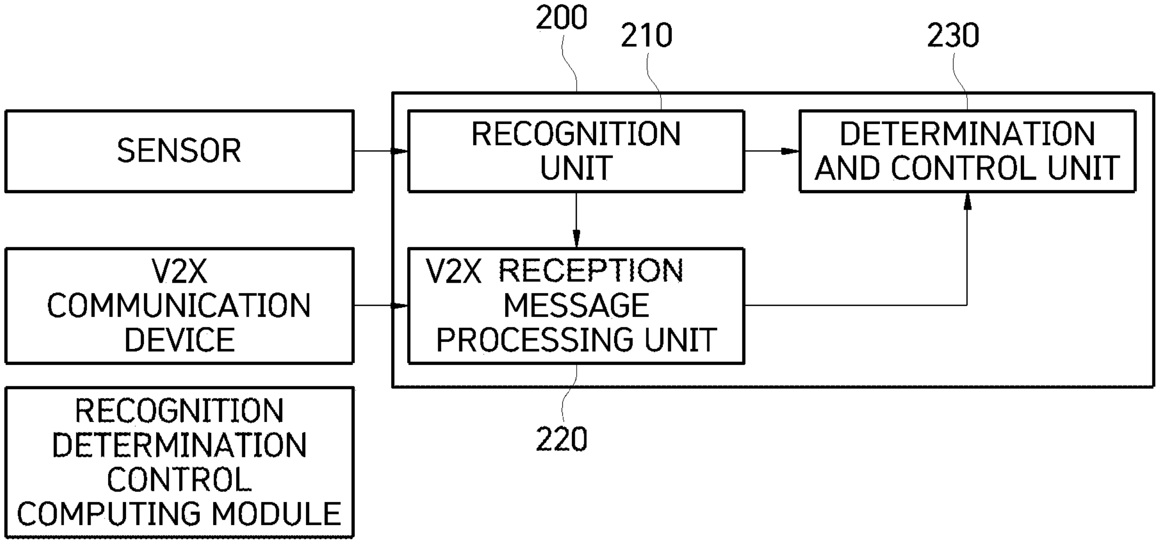
FIG. 4 is a diagram illustrating a configuration of an autonomous vehicle system according to an embodiment of the present invention.

FIG. 4 is a diagram illustrating a configuration of an autonomous vehicle system according to an embodiment of the present invention.

An autonomous vehicle system 200 according to an embodiment of the present invention includes a recognition unit 210 that receives sensing information from a sensor (lidar, camera, radar, etc.), a V2X reception message processing unit 220 that receives a V2X message from a V2X communication device (road side unit (RSU)), and a determination and control unit 230. The autonomous vehicle system 200 according to an embodiment of the present invention converges and processes an object recognition processing result using a vehicle sensor and an object recognition processing result received from the infrastructure. The recognition unit 210 recognizes a driving environment, a driving situation, and a dynamic object using a sensor. The determination and control unit 230 converges and processes the recognition result of the autonomous vehicle and the recognition result of the infrastructure to establish the driving plan, determines the action of the autonomous vehicle to generate a local area, and performs a process of following and controlling the local area. The V2X reception message processing unit 220 parses a message set received from the infrastructure, loads the recognition object into the memory, and performs a process of recording the reception time.

Figure 5:
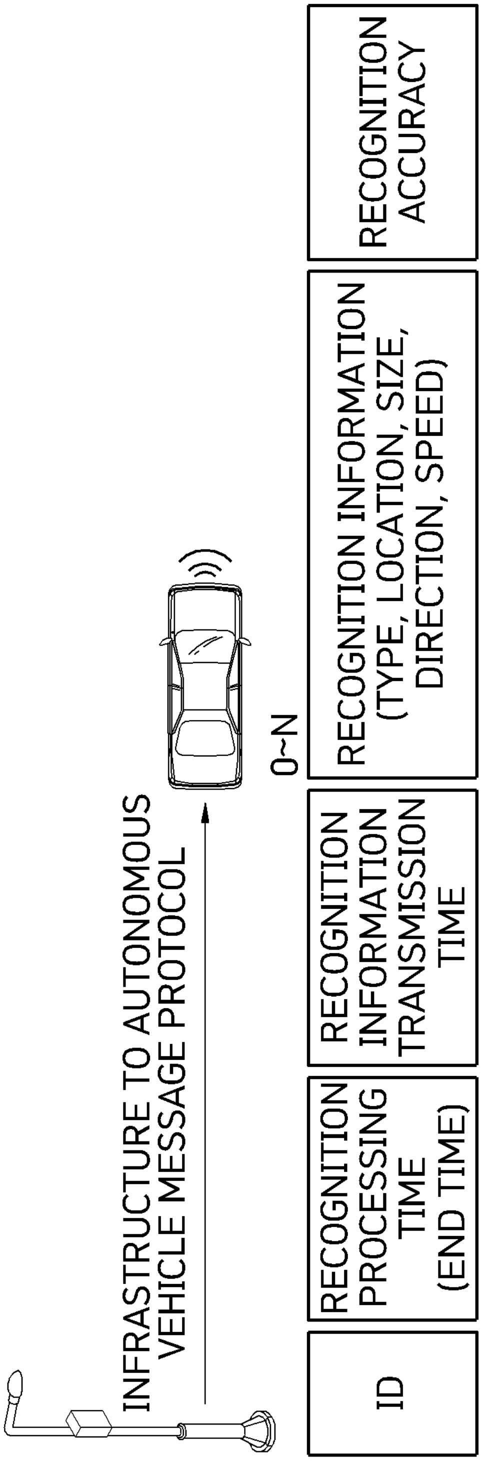
FIG. 5 is a diagram illustrating a message protocol transmitted from the InfraEdge system to the autonomous vehicle system according to the embodiment of the present invention.

FIG. 5 is a diagram illustrating a message protocol transmitted from the InfraEdge system to the autonomous vehicle system according to the embodiment of the present invention.

The message protocol transmitted from the InfraEdge system to the autonomous vehicle system includes ID, a recognition processing time, a recognition information transmission time, recognition information, and recognition accuracy. The ID is unique ID of the InfraEdge system. The recognition processing time is the time (e.g., 50 ms) from sensor input to the end of the recognition processing. The recognition information transmission time is a transmission (broadcasting) time from the V2X communication device, and the autonomous vehicle records a reception time and uses the recorded reception time to calculate the communication delay time. The recognition information (0 to N pieces) includes type (car, bus, truck, person, bike, etc.), location (x, y), size (for 2D: add width and length, for 3D: add height), direction (heading: 0 to 360° based on true north), and speed (km/hr). The recognition accuracy includes object classification (type) accuracy, object detection (location/size) accuracy, and tracking accuracy (direction/speed) values (object classification/detection accuracy mainly uses average precision (AP). For example, pedestrian classification/detection accuracy of 45%, vehicle classification/detection accuracy of 65%). It is assumed that the tracking accuracy mainly uses multi-object tracking precision (MOTA) and uses the same measure (AP, MOTA, etc.) as the recognition accuracy of the vehicle.

The recognition accuracy in the infrastructure may depend on the distance from the object, and the recognition accuracy is lower for distant objects. When an object is far away from the InfraEdge system and relatively close to the autonomous vehicle, the recognition accuracy of the autonomous vehicle may be higher. As the value of the recognition accuracy, an average value may be used regardless of the distance, and it is possible to set and use the accuracy value differently according to a reference distance of the InfraEdge location. In this case, the accuracy value may be allocated for each object of identification information.

Figure 6:
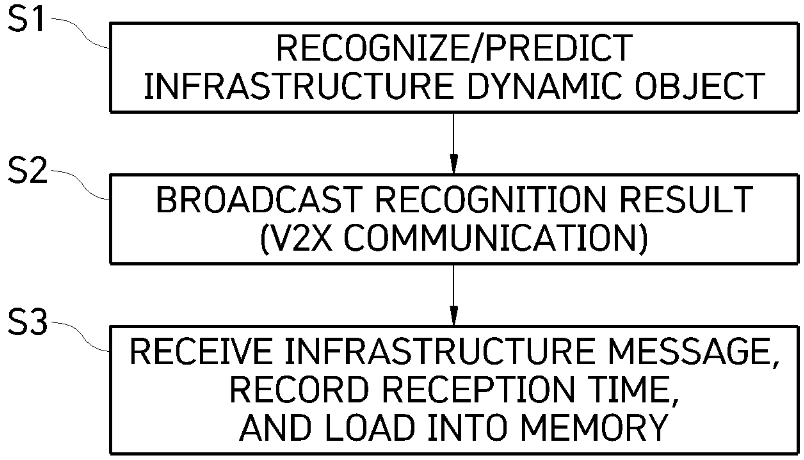
FIG. 6 is a diagram illustrating a dynamic object recognition and information transmission/reception process of an InfraEdge system according to the embodiment of the present invention.
Figure 7:
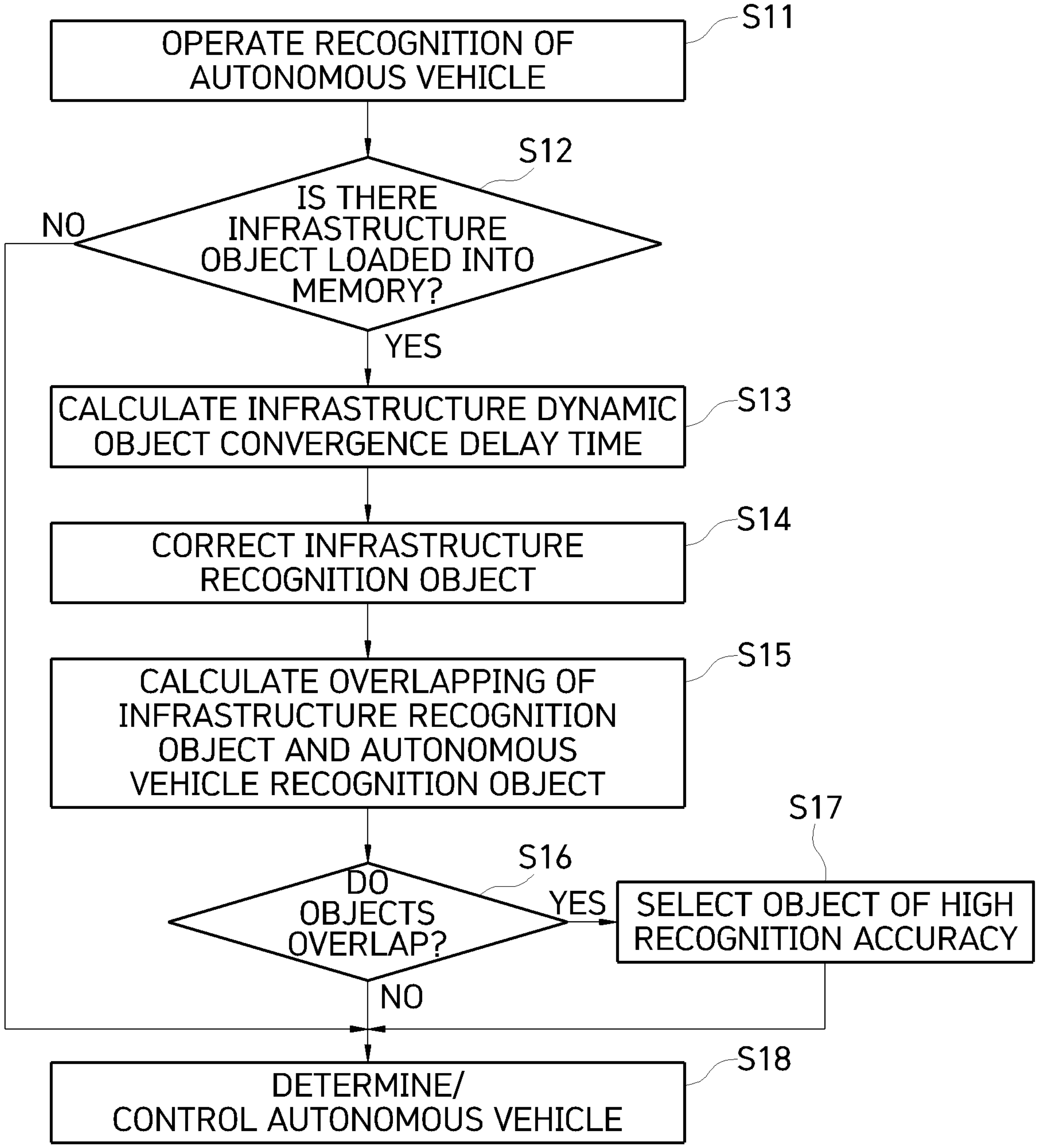
FIG. 7 is a diagram illustrating a method of infrastructure dynamic object recognition information convergence processing in an autonomous vehicle according to an embodiment of the present invention.

FIG. 6 is a diagram illustrating a dynamic object recognition and information transmission/reception process of an InfraEdge system according to the embodiment of the present invention, and FIG. 7 is a diagram illustrating a method of infrastructure dynamic object recognition information convergence processing in an autonomous vehicle according to an embodiment of the present invention.

In step S1, the InfraEdge system recognizes dynamic objects (including prediction).

In step S2, the InfraEdge system broadcasts the recognition result through the V2X communication.

In step S3, the autonomous vehicle system receives an infrastructure message, records a reception time, parses the reception time (interprets the message), and loads the infrastructure recognition object information into memory.

In step S11, the recognition operation of the autonomous vehicle is performed.

In step S12, the autonomous vehicle system confirms whether there is the infrastructure object loaded into the memory. When it is confirmed in step S12 that there is no infrastructure object loaded into the memory, the determination/control of the autonomous driving is performed based on the information sensed by the autonomous vehicle system (S18). When it is confirmed in step S12 that there is the infrastructure object loaded into the memory, in step S13, the time difference (convergence delay time) from the current time is calculated using the recorded reception time.

In step S14, the location of the infrastructure recognition object is corrected using the convergence delay time calculated in step S13.

In step S15, the overlap of the infrastructure recognition object (object whose location is corrected) and the recognition object of the autonomous vehicle is calculated.

In step S16, the object overlapping is confirmed to determine whether the object is the same object. When it is confirmed that the object is the same object, in step S17, an object having the higher recognition accuracy of the InfraEdge system or the autonomous vehicle system is selected When it is confirmed in step S16 that the object is not the same object, in step S18, since the object is recognized only by the InfraEdge system or autonomous vehicle system, the corresponding object is used for the convergence determination/control of the autonomous driving. In step S18, the determination/control operation of the autonomous driving includes action determination (e.g., stop, avoidance, overtaking, etc.), and the generation and tracking of the local route.

Hereinafter, the infrastructure recognition object detection location correction in consideration of the convergence delay time according to an embodiment of the present invention will be described with reference to FIGS. 8 to 10.

Figure 8:
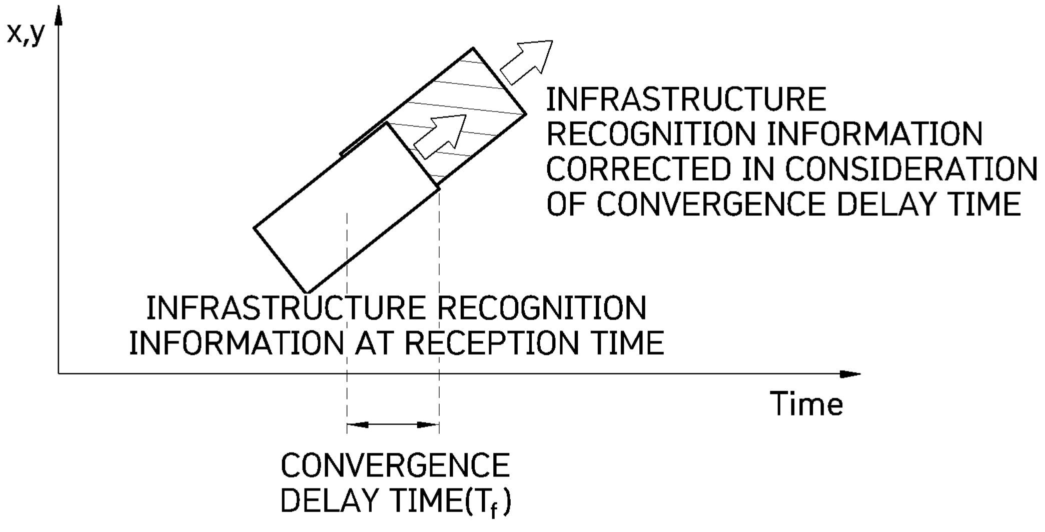
FIG. 8 is a diagram illustrating prediction correction using object tracking information according to an embodiment of the present invention.

A first method is prediction correction using object tracking information (speed/direction vector), and FIG. 8 illustrates prediction correction using object tracking information according to an embodiment of the present invention. Referring to FIG. 8, a location of an object is corrected through movement prediction for the convergence delay time using the direction information and the speed vector information of the object recognition information.

Figure 9:
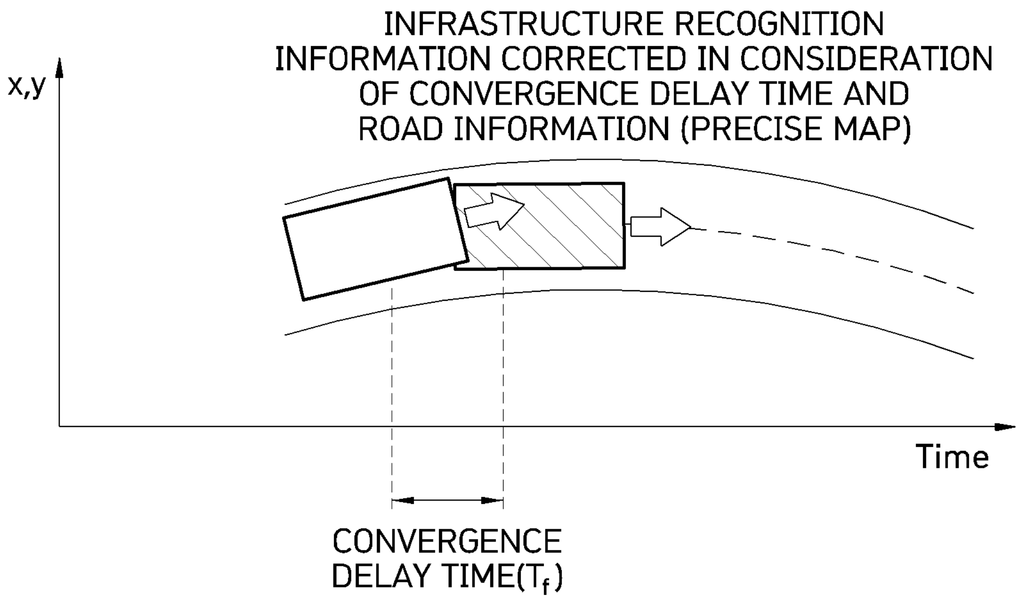
FIG. 9 is a diagram illustrating prediction correction using object tracking information and a high-precision map according to an embodiment of the present invention.

A second method is prediction correction using the object tracking information (speed/direction vector) and the high-precision map, and FIG. 9 illustrates prediction correction using the object tracking information and the high-precision map according to an embodiment of the present invention. Referring to FIG. 9, a simple vector corrects a location of an object by performing movement prediction as much as the convergence delay time using high-precision map data of a lane level (using information such as a curvature of a lane level). The high-precision map data is essential data for the InfraEdge systems and the autonomous vehicle system.

Figure 10:
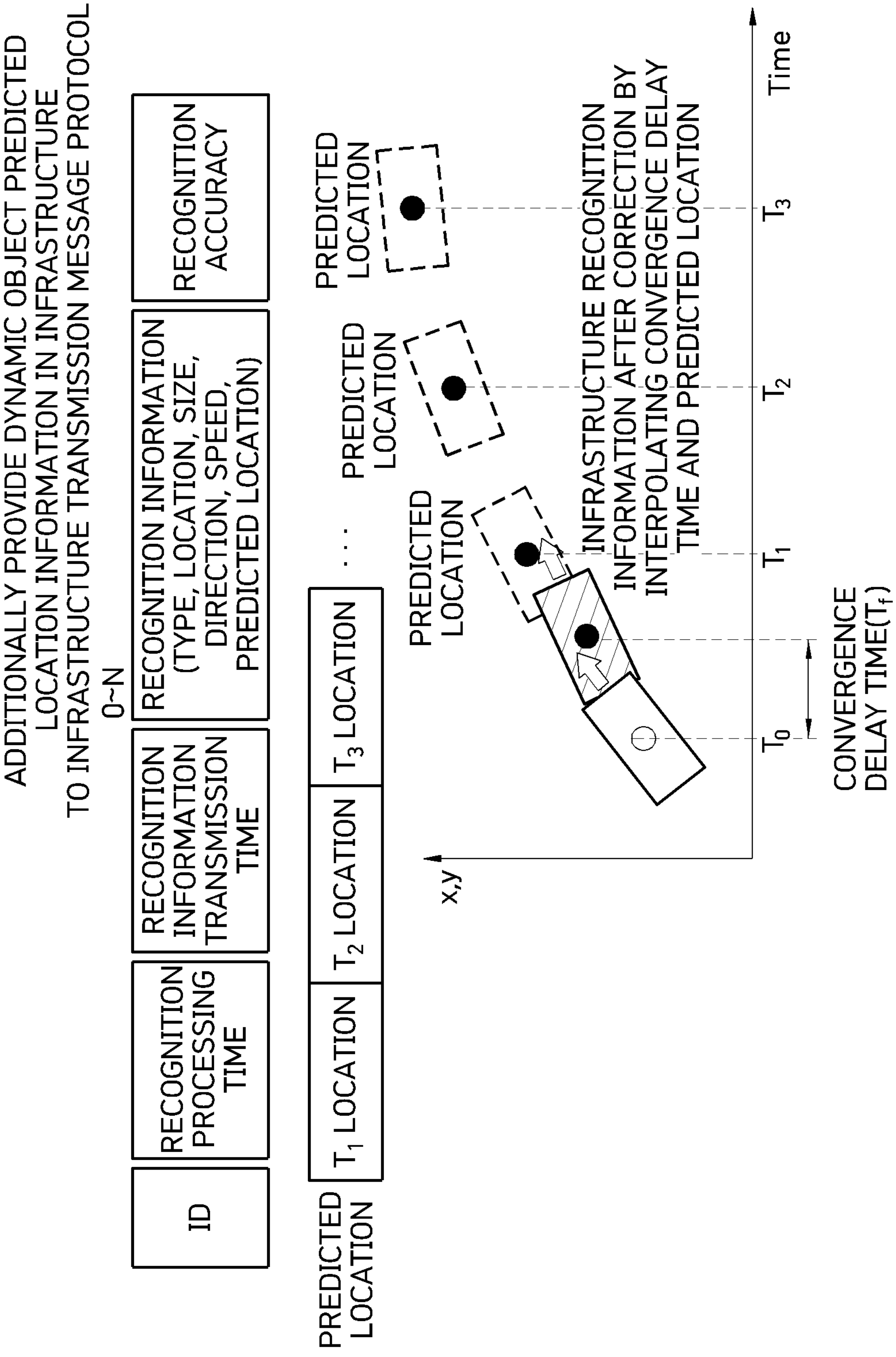
FIG. 10 is a diagram illustrating correction using object movement prediction deep learning according to an embodiment of the present invention.
Figure 11A:
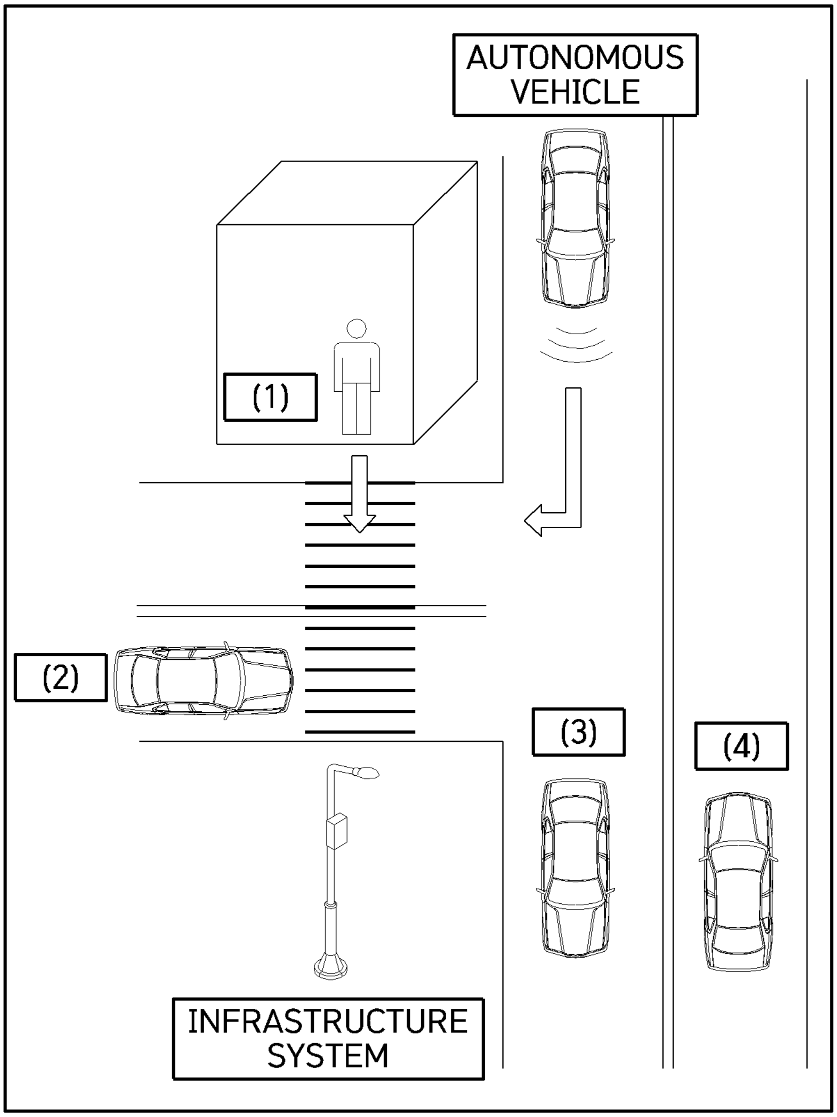
FIGS. 11A, 11B, 11C, 11D, 12A, 12B, 12C are diagrams illustrating object recognition according to an embodiment of the present invention.
Figure 11B:
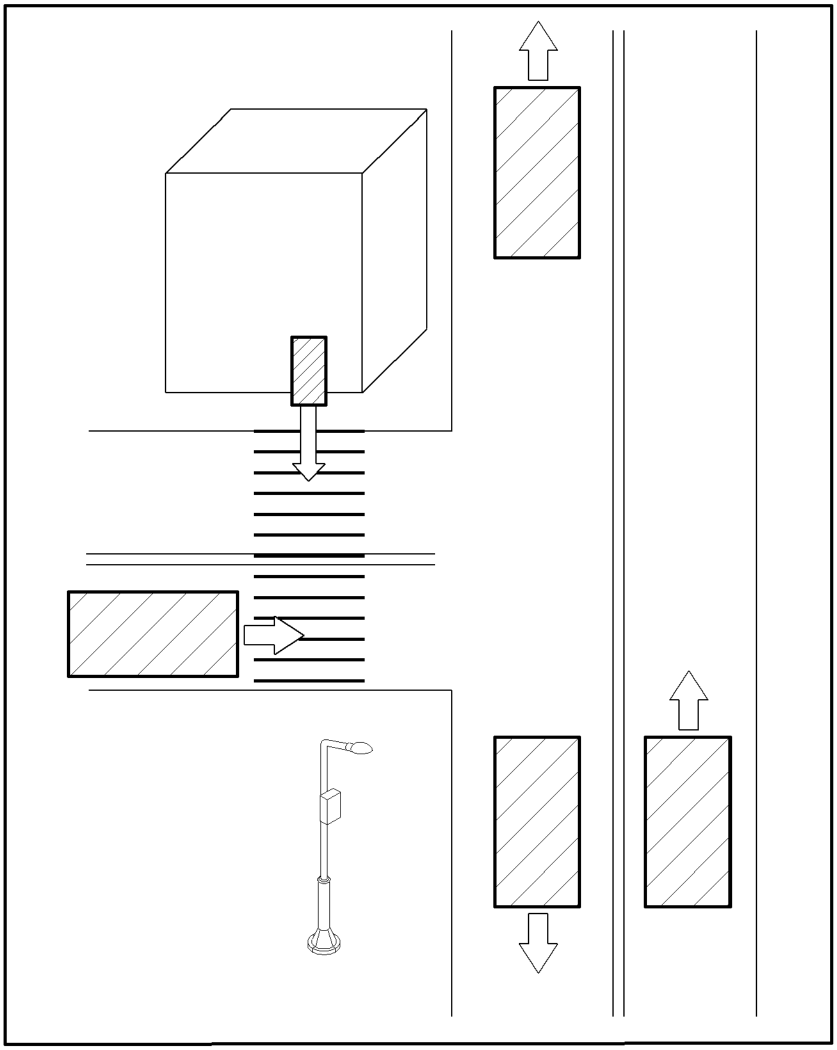
Figure 11C:
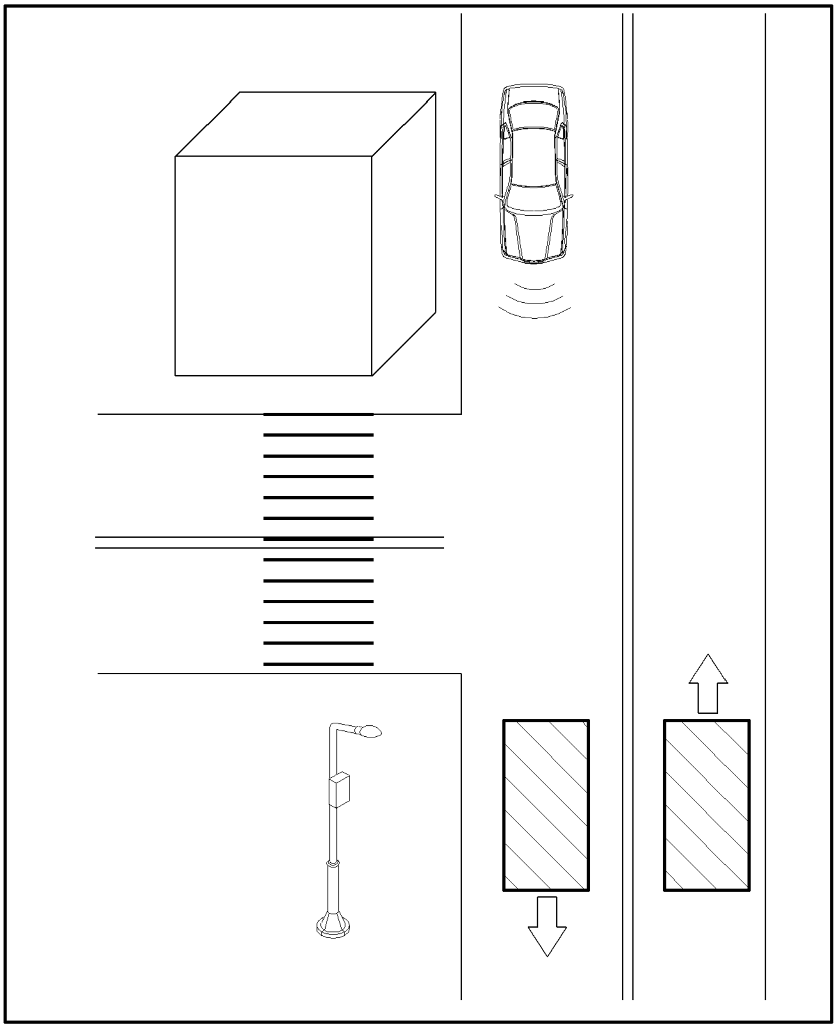
Figure 11D:
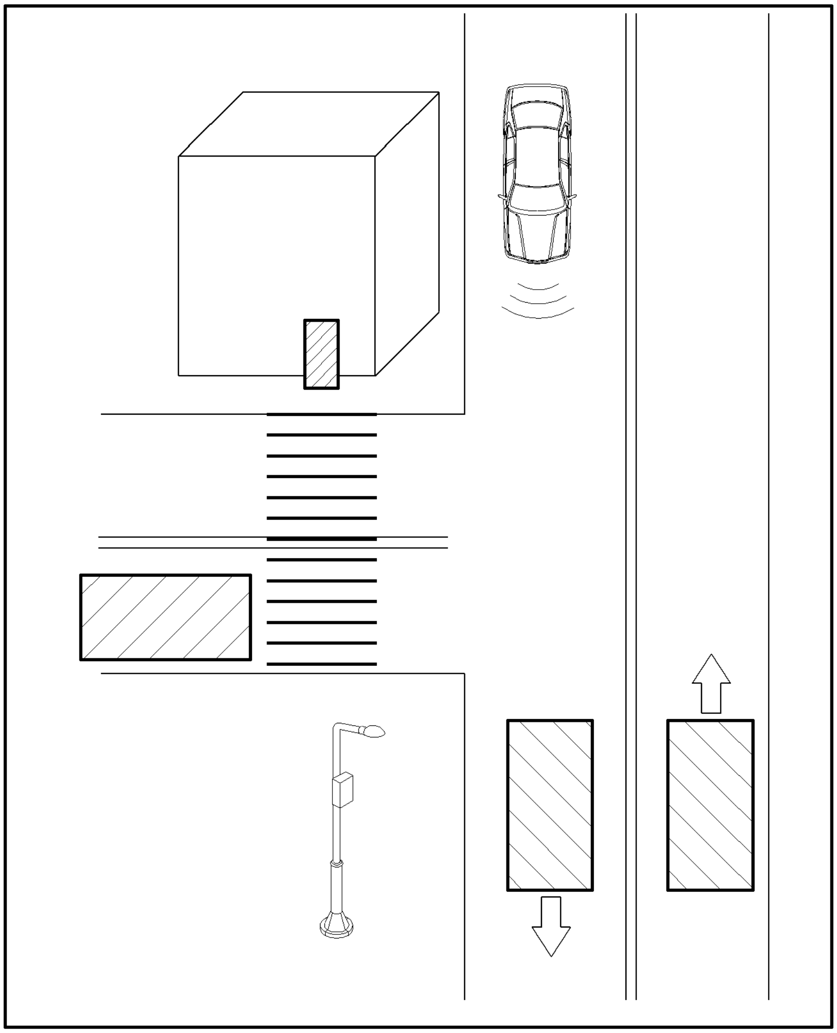

A third method is correction using object movement prediction deep learning, and FIG. 10 illustrates correction using object movement prediction deep learning according to an embodiment of the present invention. Regarding an artificial intelligence technology for predicting a location of a dynamic object of an autonomous vehicle, it is possible to predict a location up to next 4 seconds by using 2 seconds of trajectory as input, and it is possible to predict a future location of a dynamic object even in the InfraEdge system by applying the predicted location to the InfraEdge. Referring to FIG. 10, the infrastructure recognition object location information is corrected by interpolating each future predicted location by using a future predicted location ({future time, future location}) and considering the convergence delay time. To this end, the predicted location information is additionally required in the message protocol transmitted from the InfraEdge system to the autonomous vehicle system.

At a crossroad, the prediction accuracy of the prediction correction using the tracking information and the high-precision maps is low, but it is possible to predict a route more accurately using deep learning (artificial intelligence) when passing a crossroad.

Hereinafter, the selection of the recognition object of the InfraEdge system and the autonomous vehicle system will be described with reference to FIGS. 11A, 11B, 11C, 11D, and 12A to 12C.

Referring to FIGS. 11A to 11D, it is assumed that objects (1) to (4) exist, the InfraEdge system recognizes all of the objects (1) to (4), and the autonomous vehicle system does not recognize the objects (1) and (2) hidden by a building. The autonomous vehicle system receives and uses the recognition results of the objects (1) and (2) from the InfraEdge system, and uses the results recognized by the autonomous vehicle system for the objects (3) and (4).

Figure 12A:
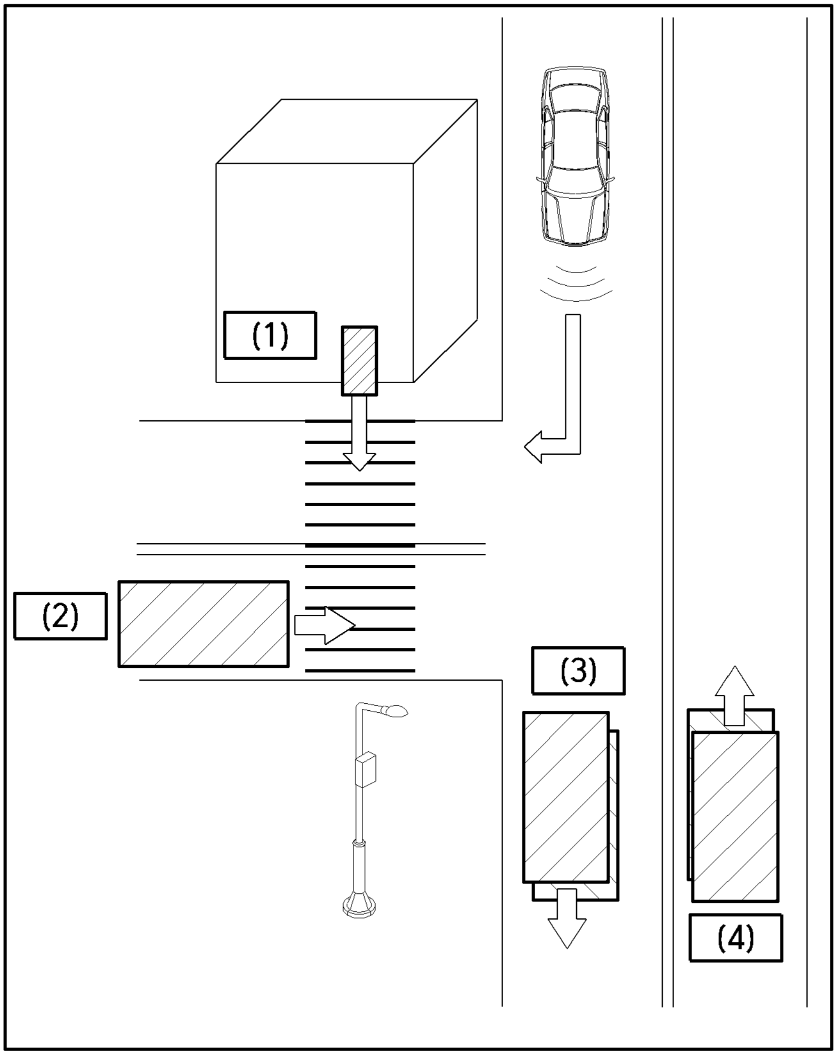

Referring to FIG. 12A, it is assumed that the InfraEdge system recognizes the objects (1) to (4) (indicated in blue), the autonomous vehicle system does not recognize the objects (1) and (2) hidden by the building, and the objects (3) and (4) are recognized (indicated in yellow).

Figure 12B:
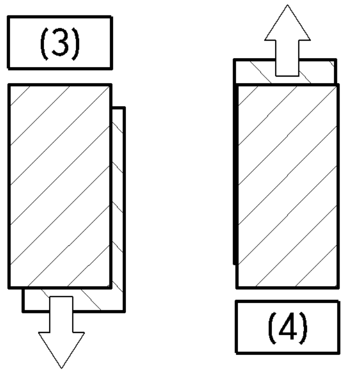

Referring to FIG. 12B, after correcting the location of the object recognized by the InfraEdge system, it is determined that the object is the same object by compared with the object recognized by the autonomous vehicle system.

The objects (1) and (2) are objects that are not recognized by the autonomous vehicle system because they are hidden by the building, and since there is no same object, the object recognized by the InfraEdge system is finally used.

Figure 12C:
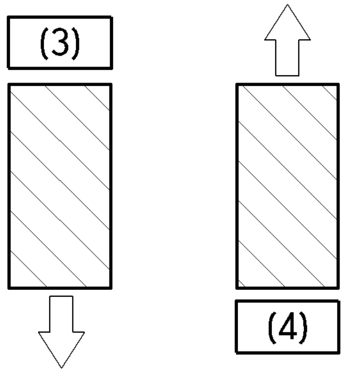

Referring to FIG. 12C, regarding the objects (3) and (4) that are finally determined to be the same object, the recognition accuracy of the InfraEdge system and the autonomous vehicle system is compared to finally select the object.

Figure 13A:
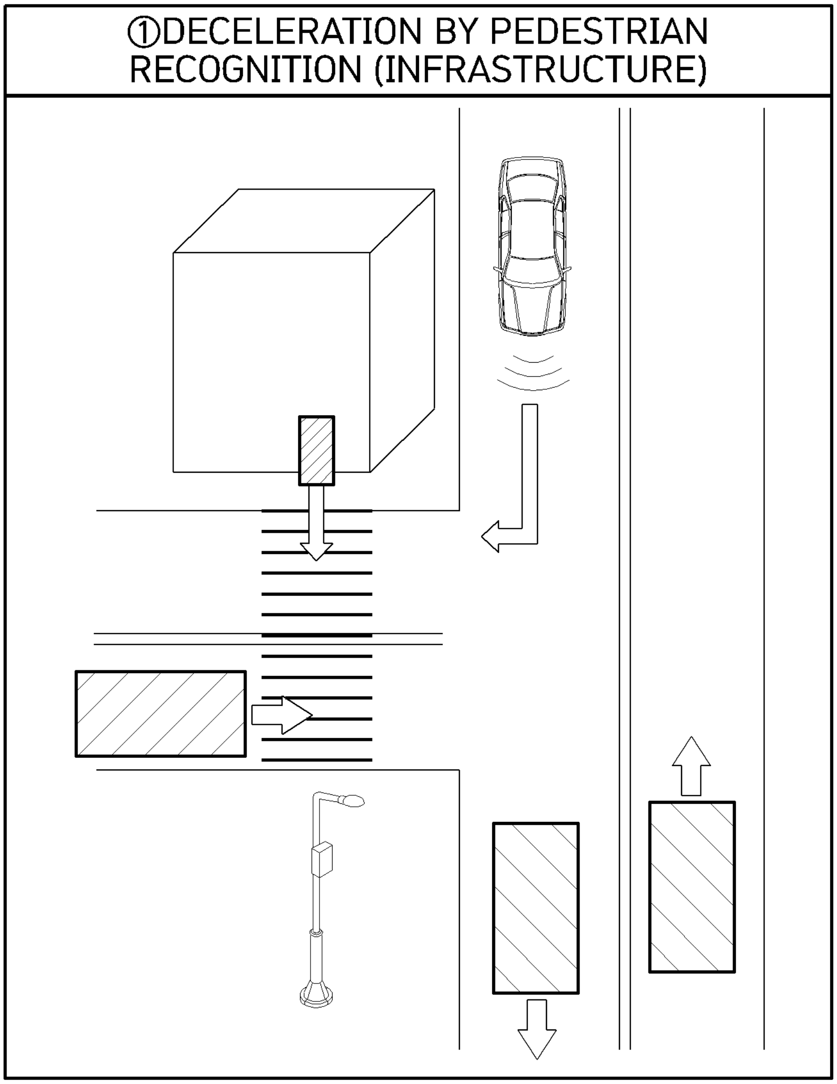
FIGS. 13A and 13B are diagrams illustrating determination and control of a final autonomous vehicle system according to an embodiment of the present invention.
Figure 13B:
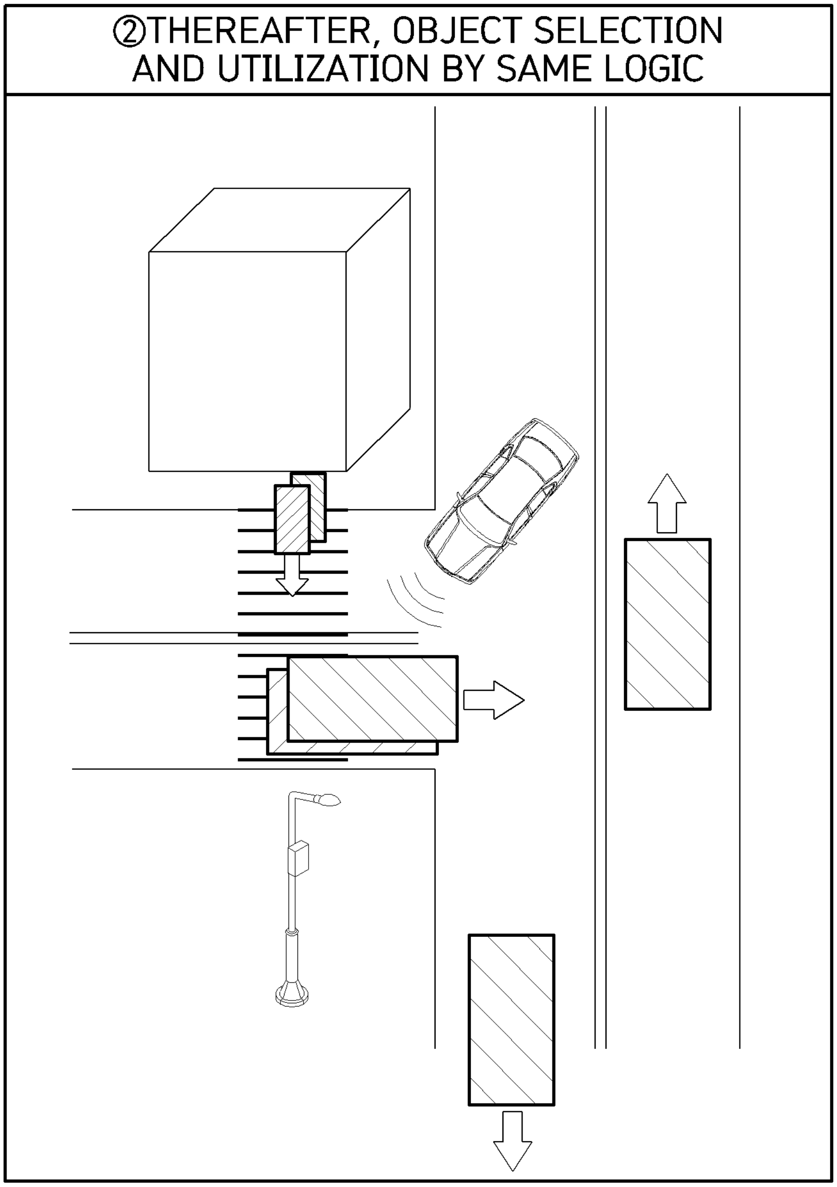

FIGS. 13A and 13B are diagrams illustrating determination and control of a final autonomous vehicle system according to an embodiment of the present invention.

Referring to FIGS. 13A and 13B, the autonomous vehicle system drives at a reduced speed by referring to the object information (pedestrian information) received from the InfraEdge system when entering a right turn, and recognizes that a pedestrian as a corresponding InfraEdge recognition object when entering a right turn is the same object (i.e., simultaneously recognized by the InfraEdge system and the autonomous vehicle system), so the determination and control of the autonomous driving is performed.

Figure 14A:
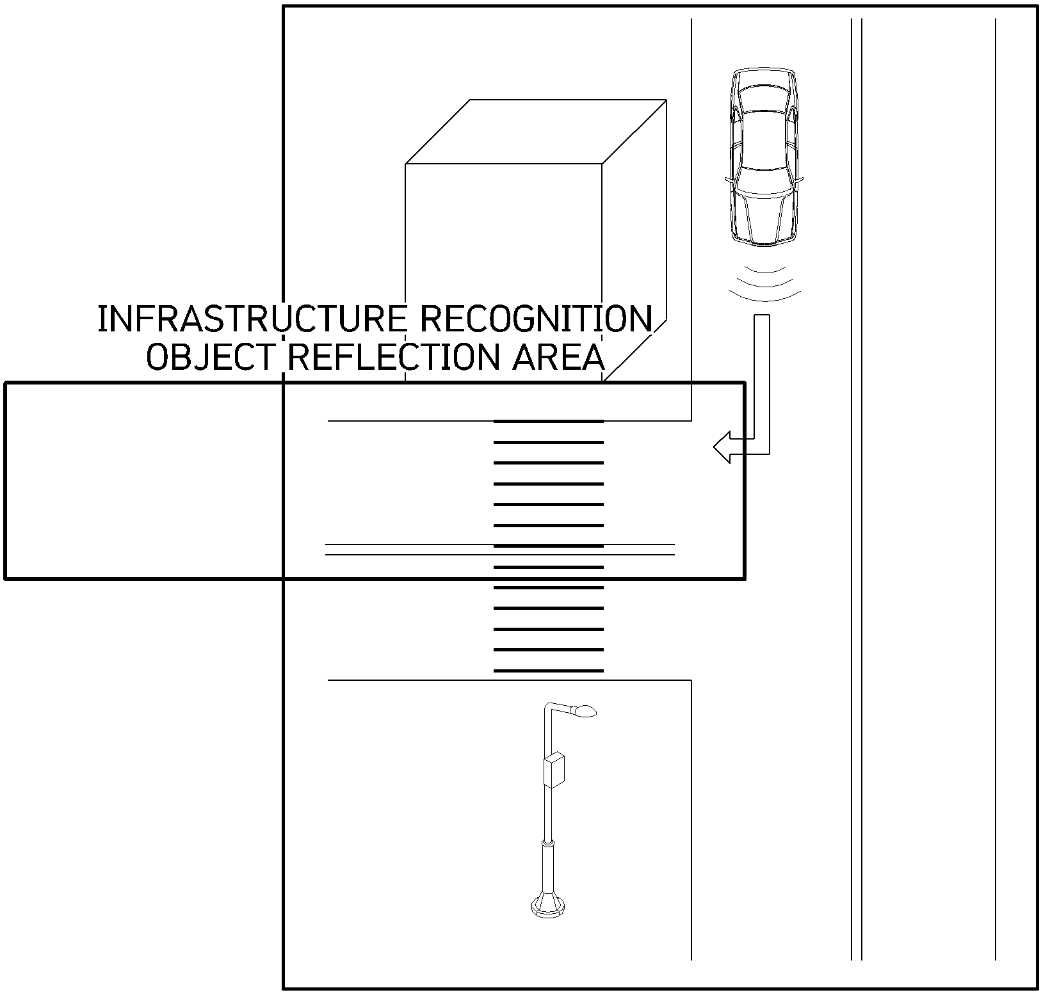
FIGS. 14A and 14B are diagrams illustrating object recognition through vehicle blind spot area setting according to another embodiment of the present invention.
Figure 14B:
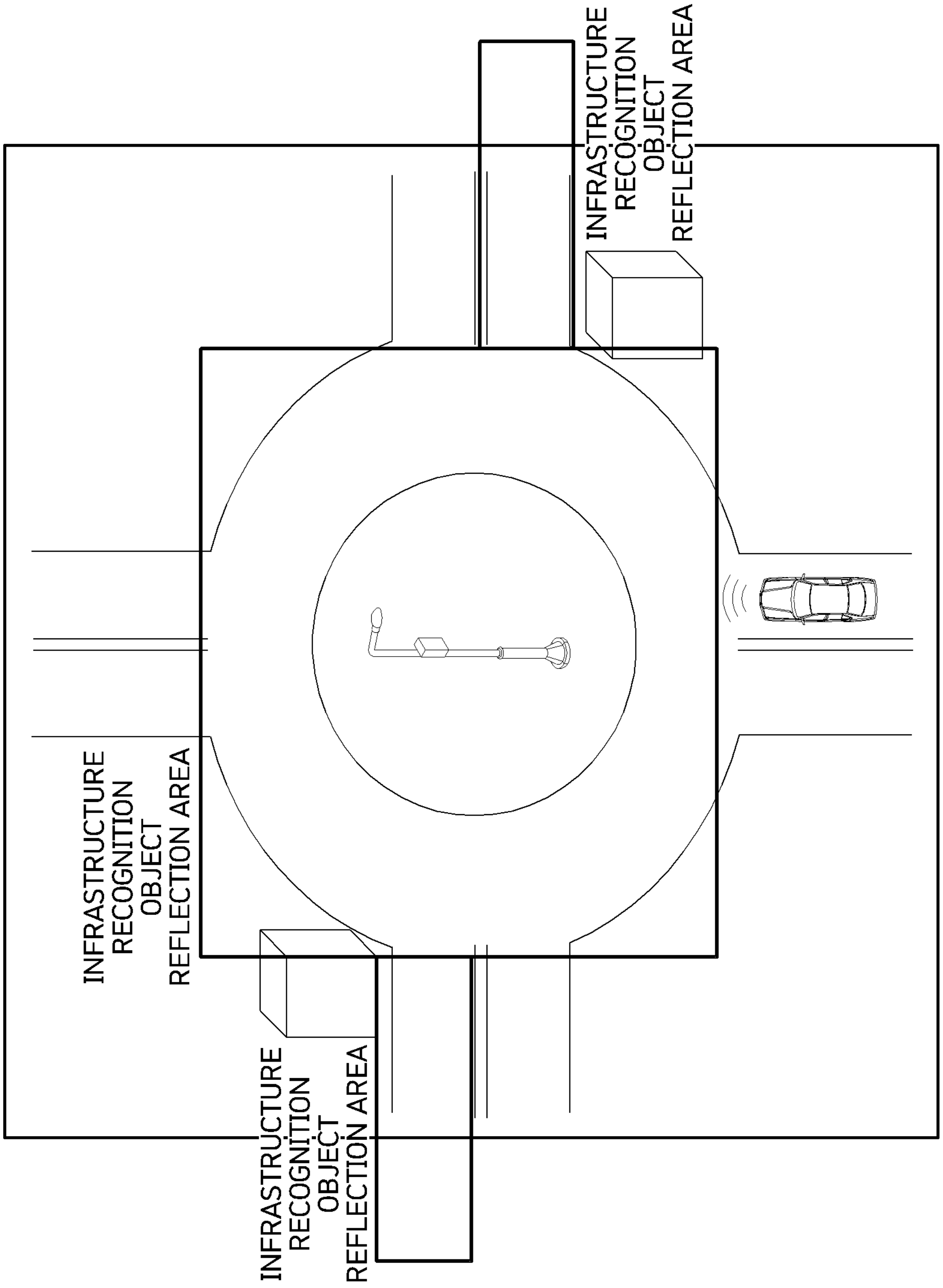
Figure 15:
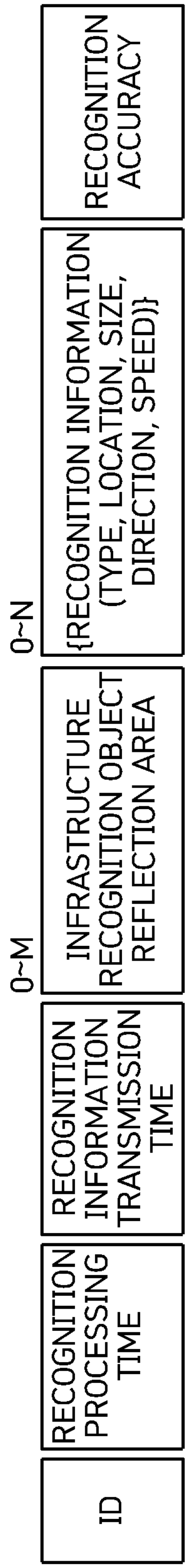
FIG. 15 is a diagram illustrating a message protocol transmitted from an InfraEdge system to an autonomous vehicle system according to another embodiment of the present invention.

FIGS. 14A and 14B are diagrams illustrating object recognition through vehicle blind spot area setting according to another embodiment of the present invention. FIG. 15 is a diagram illustrating a message protocol transmitted from an InfraEdge system to an autonomous vehicle system according to another embodiment of the present invention.

When the blind spot of the vehicle is analyzed/identified, a shaded area is set, and the autonomous vehicle recognizes an object in the shaded area using the shaded area information to preferentially select the recognition result received from the InfraEdge system and use the selected recognition result for the determination and control of the autonomous driving.

Referring to FIG. 15, the infrastructure recognition object reflection area includes the form of a polygon or box, or a link (center line of a lane) ID (in case of link ID of a lane, it is assumed that the InfraEdge system and the autonomous vehicle system use the same high-precision map (same lane center line ID)) of a lane.

Figure 16:
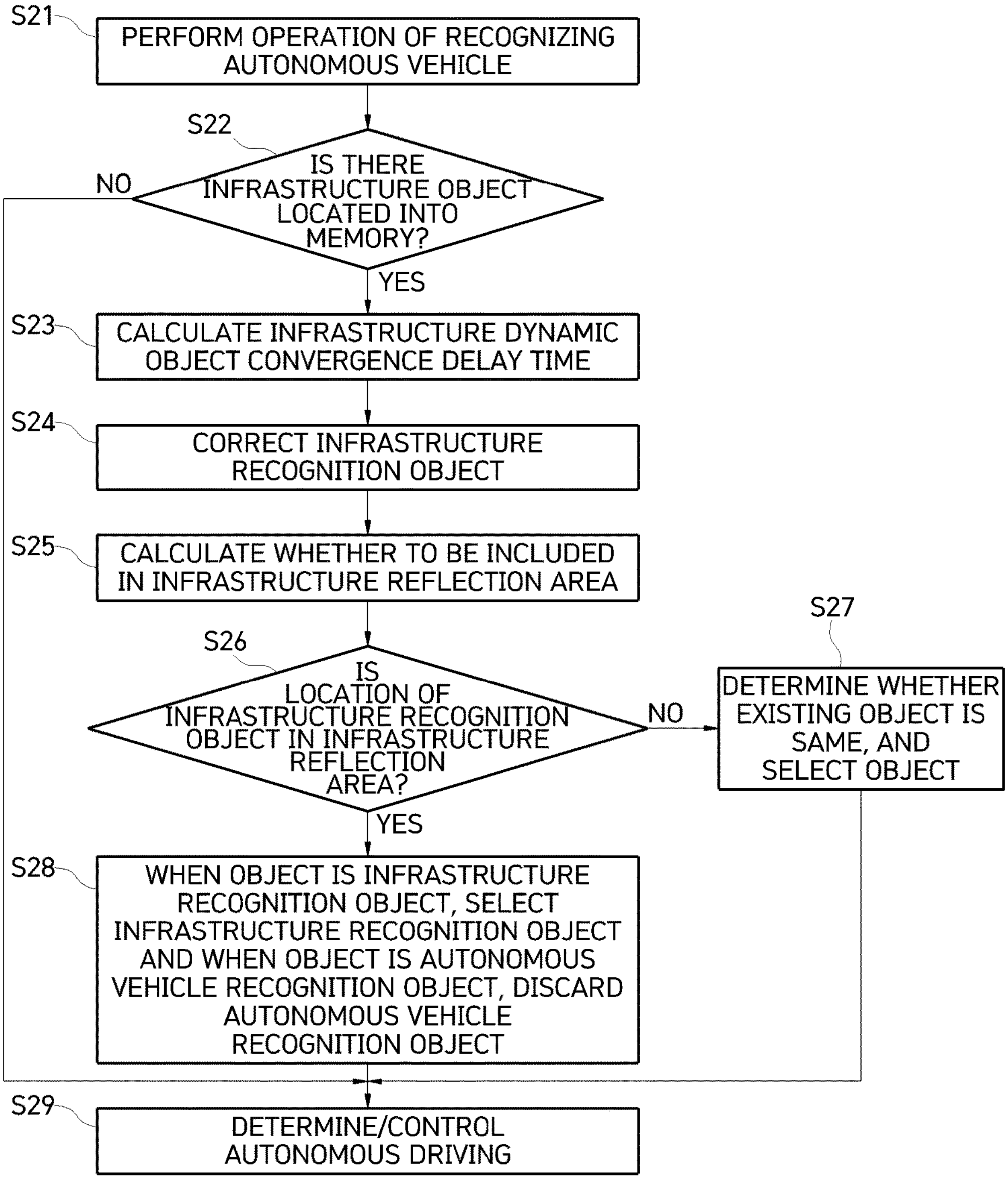
FIG. 16 is a diagram illustrating a method of infrastructure dynamic object recognition information convergence processing in an autonomous vehicle according to another embodiment of the present invention.

FIG. 16 is a diagram illustrating a method of infrastructure dynamic object recognition information convergence processing in an autonomous vehicle according to another embodiment of the present invention.

In step S21, the recognition operation of the autonomous vehicle is performed.

In step S22, the autonomous vehicle system confirms whether there is the infrastructure object loaded into the memory. When it is confirmed in step S22 that there is no infrastructure object loaded into the memory, the determination/control of the autonomous driving is performed based on the information sensed by the autonomous vehicle system (S29). When it is confirmed in step S22 that there is an infrastructure object loaded into the memory, in step S23, the time difference (convergence delay time) from the current time is calculated using the recorded reception time.

In step S24, the location of the infrastructure recognition object is corrected using the convergence delay time calculated in step S23.

In step S25, it is calculated whether the location of the infrastructure recognition object is included in the infrastructure reflection area.

In step S26, it is confirmed whether the location of the infrastructure recognition object is included in the infrastructure reflection area, and if not included, it is determined whether the object is the same object as in the method according to the embodiment of the present invention, and the object is selected (S27). When the location of the infrastructure recognition object is included in the infrastructure reflection area, in step S28, when the object is an infrastructure recognition object, the infrastructure recognition object is selected, and when the object is an autonomous vehicle recognition object, the autonomous vehicle recognition object is discarded.

In step S29, the determination/control operation of the autonomous driving includes action determination (e.g., stop, avoidance, overtaking, etc.), and generation and tracking of a local route.

According to the present invention, by using object information accurately determined by infrastructure in relation to an object that an autonomous vehicle does not recognize and selecting more accurate object information in relation to the same object that is redundantly recognized through sharing of an object recognition result and cooperative autonomous driving of an autonomous vehicle and infrastructure, it is possible to enable safer cooperative autonomous driving.

The effects of the present invention are not limited to those mentioned above, and other effects not mentioned can be clearly understood by those skilled in the art from the following description.

Figure 17:
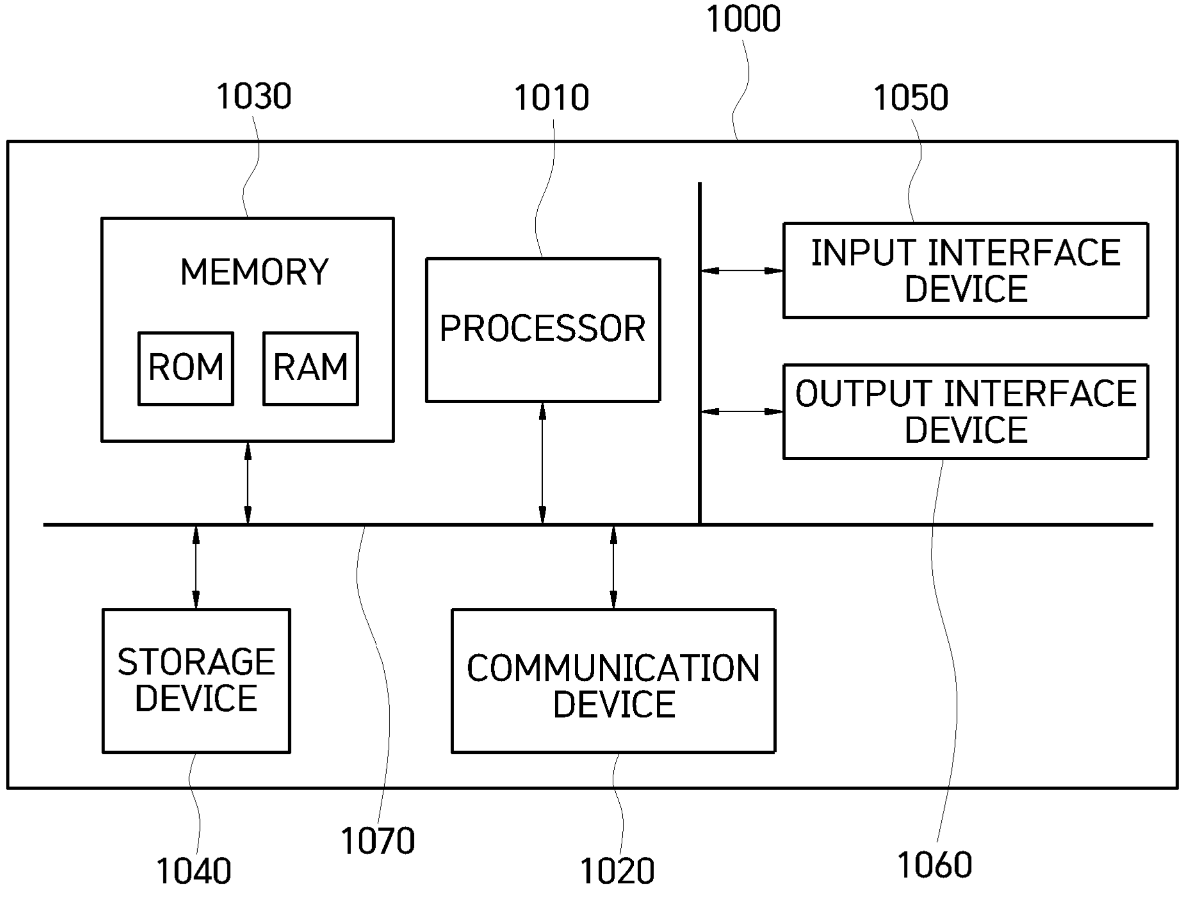
FIG. 17 is a block diagram illustrating a computer system for implementing the method according to the embodiment of the present invention.

FIG. 17 is a block diagram illustrating a computer system for implementing the method according to the embodiment of the present invention.

Referring to FIG. 17, a computer system 1000 may include at least one of a processor 1010, a memory 1030, an input interface device 1050, an output interface device 1060, and a storage device 1040 that communicate through a bus 1070. The computer system 1000 may also include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random access memory (RAM). In the embodiment of the present disclosure, the memory may be located inside or outside the processing unit, and the memory may be connected to the processing unit through various known means. The memory may be various types of volatile or non-volatile storage media, and the memory may include, for example, a ROM or a RAM.

An apparatus for predicting AI useful life based on accelerated life testing data according to an embodiment of the present invention includes an input interface device 1050 that receives accelerated life training data and actual operation testing result, a memory 1030 that stores a program for predicting life of a device by applying an adversarial deep learning model based on acceleration constraints, and a processor 1010 that executes a program, in which the processor 1010 performs the life prediction using the actual operation testing result based on the difference between intercepts calculated for each domain on the life distribution estimation line which is the accelerated life testing result.

The input interface device 1050 receives data according to the accelerated variable setting, receives data of a first domain, in which a correct life value exists, as the accelerated life training data by an accelerated life test, and receives data of a second domain for which life prediction is required as the actual operation testing result.

The processor 1010 performs life prediction using branched regression networks for each domain of data received by the input interface device 1050, and the regression network shares a slope weight parameter value in the same layer of the branched networks for each of the plurality of domains included in the first domain.

The processor 1010 performs learning by limiting a numerical range so that the intercept parameter values are listed in descending order in the same layer of the branched networks for each of the plurality of domains included in the first domain.

The processor 1010 performs adversarial learning to recognize the first domain and the second domain as one domain.

The processor 1010 readjusts the learning parameters of the second domain by confirming the linear relationship between the slope weight parameter and the difference between the intercepts.

The embodiment of the present invention may be implemented as a computer-implemented method, or as a non-transitory computer-readable medium having computer-executable instructions stored thereon. In one embodiment, when executed by the processing unit, the computer-readable instructions may perform the method according to at least one aspect of the present disclosure.

The communication device 1020 may transmit or receive a wired signal or a wireless signal.

In addition, the method according to the embodiment of the present invention may be implemented in a form of program instructions that may be executed through various computer means and may be recorded in a computer-readable recording medium.

The computer-readable recording medium may include a program instruction, a data file, a data structure or the like, alone or a combination thereof. The program instructions recorded in the computer-readable recording medium may be configured by being especially designed for the embodiment of the present invention, or may be used by being known to those skilled in the field of computer software. The computer-readable recording medium may include a hardware device configured to store and execute the program instructions. Examples of the computer-readable recording medium may include magnetic media such as a hard disk, a floppy disk, and a magnetic tape, optical media such as a compact disk read only memory (CD-ROM) or a digital versatile disk (DVD), magneto-optical media such as a floptical disk, a ROM, a RAM, a flash memory, or the like. Examples of the program instructions may include a high-level language code capable of being executed by a computer using an interpreter, or the like, as well as a machine language code made by a compiler.

According to the present invention, in predicting life of mechanical parts or electronic devices, it is possible to perform life estimation based only on accelerated life testing data without considering a separate life estimation model or life data distribution characteristics through an application of an adversarial deep learning model based on acceleration constraints.

According to the present invention, by applying an adversarial learning model, it is possible to solve the problem of different data characteristics between accelerated life testing data for deep learning model training and actual operational data for life inference in the real environment, and increase predictive validity of data having different characteristics.

According to the present invention, it is possible to easily obtain a life estimation result in an operating environment to be obtained by modifying some learning parameters of a deep learning model without mathematical consideration of acceleration conditions, use condition distribution, life-stress relationship, etc., when a life estimation model is applied.

The effects of the present invention are not limited to those mentioned above, and other effects not mentioned can be clearly understood by those skilled in the art from the following description.

Although embodiments of the present invention have been described in detail hereinabove, the scope of the present invention is not limited thereto, but may include several modifications and alterations made by those skilled in the art using a basic concept of the present invention as defined in the claims.

What is claimed is:

1. A system for infrastructure dynamic object recognition information convergence processing in an autonomous vehicle, the system comprising:

a recognition unit configured to receive object information collected by a sensor of the autonomous vehicle to recognize an environment;

a V2X reception message processing unit configured to receive object information collected by an InfraEdge system; and a determination and control unit configured to use the object information collected by the sensor and the object information collected by the InfraEdge system, and perform a determination for autonomous driving in consideration of a reflection area of the InfraEdge system, wherein the determination and control unit corrects a location of an object included in the object information collected by the InfraEdge system in consideration of the convergence delay time, which is a time difference between a time recorded according to message reception of the V2X reception message processing unit and a current time, wherein the determination and control unit considers a corrected location of the object included in the object information collected by the InfraEdge system and the reflection area of the InfraEdge system, and when the location information of the corrected location of the object included in the object information collected by the InfraEdge system is included in the reflection area, if the object is a recognized object recognized by the InfraEdge system, uses the recognized object to determine the autonomous driving, and if it is an object recognized by the sensor of the autonomous vehicle, discards the recognized object, and wherein the determination and control unit establishes a driving plan using the object information collected by the sensor and the object information collected by the InfraEdge system, and generates and follows a local route.

2. The system of claim 1, wherein the V2X reception message processing unit receives a message transmitted according to a message protocol including ID of the InfraEdge system, a recognition processing time, a recognition information transmission time, the reflection area, recognition information, and recognition accuracy of the InfraEdge system.

3. The system of claim 2, wherein the determination and control unit considers location information of a corrected object and the reflection area of the InfraEdge system to calculate an overlap between the location information of the corrected object and location information in the object information collected by the sensor of the autonomous vehicle when the location information of the corrected object and the location information of the collected object are not included in the reflection area and confirm whether the object is the same object, and uses the object information collected by a sensor of the autonomous vehicle and the object information collected by an InfraEdge system to determine the autonomous driving when it is confirmed that the object is not the same and selects a final object based on recognition accuracy when it is confirmed that the object is the same object.

4. A method of infrastructure dynamic object recognition information convergence processing in an autonomous vehicle, the method comprising:

(a) collecting first object information collected by a sensor of an autonomous vehicle and second object information collected by an InfraEdge system; and (b) establishing a driving plan for autonomous driving in consideration of a convergence delay time which is a time difference between a time recorded according to reception of the second object information and a current time, wherein, when considering a reflection area of the InfraEdge system, in step (a), in collecting the second object information, a message transmitted according to a message protocol additionally including the reflection area is received, wherein, in step (b), it is confirmed whether the location of the second object information on which the correction is performed in consideration of the convergence delay time is included in the reflection area of the InfraEdge system, and when the location of the second object information is included in the reflection area, the second object information is used to establish the driving plan, and wherein, in step (b), the driving plan is executed by generating and following a local route based on the established driving plan.

5. The method of claim 4, wherein, in step (a), when the second object information is collected, the message transmitted according to the message protocol including ID, a recognition processing time, a recognition information transmission time, recognition information, and recognition accuracy of the InfraEdge system is received.

6. The method of claim 4, wherein, in step (b), a location of an object included in the second object information is corrected in consideration of the convergence delay time and an overlap between a location of a corrected object and a location included in the first object information is calculated to confirm whether the object is the same object.

7. The method of claim 6, wherein, in step (b), when it is confirmed that the object is not the same, the object information collected by a sensor of the autonomous vehicle and the object information collected by an InfraEdge system are used to establish the driving plan, and when it is confirmed that the object is the same object, a final object is selected based on the recognition accuracy.

8. The method of claim 5, wherein, in step (b), it is confirmed whether the location of the second object information on which correction is performed is included in the reflection area of the InfraEdge system in consideration of the convergence delay time, and when the location of the second object information is not included in the reflection area, an overlap between the location of the second object information on which the correction is performed and the location of the first object information is calculated to confirm whether the object is the same object, when it is confirmed that the object is not the same, a corresponding object is used to establish the driving plan, and when it is confirmed that the object is the same object, a final object is selected based on the recognition accuracy.

* * * * *